United States Patent [19]

Kotok et al.

[11] 4,388,685

[45] Jun. 14, 1983

[54] CENTRAL PROCESSOR WITH APPARATUS FOR EXTENDED VIRTUAL ADDRESSING

[75] Inventors: Alan Kotok, Harvard; Daniel L. Murphy, Framingham; Robert E. Stewart, Stow, all of Mass.

[73] Assignee: Digital Equipment Corporation, Maynard, Mass.

[21] Appl. No.: 163,097

[22] Filed: Jun. 26, 1980

Related U.S. Application Data

[63] Continuation of Ser. No. 931,059, Aug. 4, 1978.

[51] Int. Cl.³ .............................................. G06F 9/36
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,401,375 | 9/1968 | Bell et al. | 364/200 |
| 3,560,933 | 2/1971 | Schwartz | 364/200 |
| 3,657,705 | 4/1972 | Mekota, Jr. et al. | 364/200 |
| 3,818,460 | 6/1974 | Beard et al. | 364/200 |
| 3,854,126 | 12/1974 | Gray et al. | 364/200 |
| 3,938,096 | 2/1976 | Brown et al. | 364/200 |
| 3,942,155 | 3/1976 | Lawlor | 364/200 |
| 3,976,976 | 8/1976 | Khosharian | 364/200 |
| 4,042,911 | 8/1977 | Bourke et al. | 364/200 |
| 4,047,243 | 9/1977 | Dijkstra | 364/200 |
| 4,047,247 | 9/1977 | Stanley et al. | 364/200 |
| 4,126,894 | 11/1978 | Cronshaw et al. | 364/200 |
| 4,128,875 | 12/1978 | Thurber et al. | 364/200 |

OTHER PUBLICATIONS

PDP-10 Reference Handbook, Copyright 1967, 1968, 1969, 1970, 1971 by Digital Equipment Corporation, pp. 1-12, 1-13, and 1-14.

DECsystem-10/DECsystem-20 Hardware Reference Manual, vol. I, Central Processor, Copyright 1978 by Digital Equipment Corporation, pp. 1-15 through 1-22.

*Primary Examiner*—Raulfe B. Zache
*Attorney, Agent, or Firm*—Cesari and McKenna

[57] ABSTRACT

A central processor for use in a data processing system that is adapted for addressing a substantially larger virtual memory than the address space defined by the memory address field in an instruction normally provides. Information identifying an extended address is placed in working registers of the central processor. Other working registers in the central processor receive information corresponding to the memory word addressed by the instruction word. If the memory word requires indexing, the central processor adds the contents of an index register to the address contained in the memory address field of the memory word. If the resultant address is extended, the arithmetic and logic unit's carry logic is not inhibited and the larger address space is provided to one of the working registers. Concurrently, control logic is set within the central processor which causes the central processor to interpret the information as an extended address. If the memory word indicates that another memory word is required, the central processor performs similar calculations on the indirect word until an effective address is calculated. Several levels of indirection can be performed depending upon the characteristics of each preceding indirect word.

8 Claims, 8 Drawing Figures

TYPICAL INSTRUCTION WORD

INSTRUCTION FORMAT INDIRECT WORD

EXTENDED FORMAT INDIRECT WORD

EXTENDED FORMAT DIRECT WORD

EXTENDED EFFECTIVE ADDRESS CALCULATION

CENTRAL PROCESSOR WITH APPARATUS FOR EXTENDED VIRTUAL ADDRESSING

CROSS REFERENCE TO RELATED U.S. PATENTS, PATENT APPLICATIONS, AND PUBLICATIONS

This application is a continuation of U.S. patent application No. 931,059 filed by Alan Kotok et al on Aug. 4, 1978 for a "Central Processor with Means for Extended Virtual Addressing," which application is assigned to the same assignee as the present application.

U.S. patent application No. 609,546 by Kotok et al, filed on Oct. 3, 1975, for "Apparatus for Identifying the Chronological Order of Use of Information in a Cache Memory" and assigned to the same assignee as the present invention, now abandoned;

U.S. Pat. No. 4,099,231 by Sullivan et al, issued on July 4, 1978, for "Memory Control System for Transferring Selected Words in Multiple Memory Word Exchange During One Memory Cycle" and assigned to the same assignee as the present invention; and "DECsystem-10/DECSYSTEM-20 Hardware Reference Manual, Volume 1, Central Processor," Digital Equipment Corporation, 1978.

"PDP10 Reference Handbook," Digital Equipment Corporation, 1967, 1971

BACKGROUND OF THE INVENTION

This invention generally relates to data processing systems and, more specifically, to a central processor that is adapted from processing addresses in one address section (local addressing) to processing addresses in several address sections (extended or global addressing).

A conventional central processor for a data processing system has a fixed address space that determines the maximum virtual memory which can be addressed by the virtual processor. For example, in the DECsystem-10, manufactured by Digital Equipment Corporation, the address space is 18 bits and the virtual memory, which is directly addressable without index modification, would be 256K of memory locations.

The previously referenced PDP10 Reference Handbook specifically describes a process for generating "effective" addresses of virtual memory locations in the DECsystem-10. In this system, an instruction contains an instruction code field, an accumulator address field, an address type (I) field, an index register address (X) field and a memory address (Y) field. The Y field contains eighteen bits. An index register contains thirty-six bits; however, only eighteen bits are used as an index value. The other eighteen bits can be used for some other purpose, such as counting. Whenever an instruction is processed, the contents of the I, X and Y fields, or addressing fields, must be used to produce an effective address that identifies the location of the operand in the system. If the X field is not zero, the index value from an index register identified by the X field is added to the contents of the Y field to obtain a modified address. If the X field is zero, no indexing occurs, and the modified address and the contents of the Y field are identical. If the I field is zero, the addressing is "direct" and the modified address is the effective address of the desired virtual memory location.

If the I field is not zero, the addressing is indirect, so the system retrieves a new word from the location identified by the modified address. This new word also contains I, X and Y fields in locations that correspond to the locations of the instruction word in the system. They are processed in the same manner as the fields in the instruction are processed. That is, the X and Y fields determine the effective address if the I field is zero; otherwise the X and Y fields determine the address of another new word. New words continue to be obtained for calculating effective addresses until a word is obtained with an I field value of zero. Then the eighteen-bit number calculated from that word is the effective address of the desired virtual memory location.

In this system, any carry from the addition of the index value and the contents of the Y field is disregarded, so all effective addresses are limited to eighteen bits. This defines the same address space that can be defined by the Y field, and locations within the defined 256K locations are said to be in the local virtual address space.

Normally, if a program is larger than the local virtual address space, memory address management for the program's memory address space is required. In prior systems, a memory management system is provided that allows overlays of the various program routines into virtual memory. Each such overlay divides the information into pages which can then be read from virtual memory. The central processor then, via tables in a mapping scheme, determines the actual, or physical, location which should be referenced. Obviously, as more routines are used by the central processor, the physical memory becomes completely used and swapping of the routines into the physical memory is required. However, by overlaying and using swapping, the central processor "believes" that it has a much larger virtual memory than actually existed. The problem is compounded when one realizes that the data referenced by the routines may also be included in the memory space. The problem with overlaying is that one must figure out how to break up the routines into appropriate overlays. With the instant invention, a larger virtual address space is provided thereby alleviating the problems of overlaying and swapping.

Another prior art system uses a base register to increase the size of the virtual memory. However, this prior art system is static in that once the size of the virtual memory has been established by the base register, all memory references are made based upon the address size identified in the base register. While this somewhat alleviates the problem of an increased virtual address space, it also increases the complexity for any effective address calculation. Obviously, it would be desirable to have a system which can switch from one state to another depending upon the needs required at the moment.

SUMMARY OF THE INVENTION

Therefore, it is an object of this invention to provide a central processor which increases the amount of directly addressable virtual memory without increasing the size of the addressing fields in an instruction.

It is another object of this invention to provide a central processor that is capable of calculating addresses for locations both within and outside the local virtual address space.

It is yet a further object of this invention to provide a central processor that enables a sufficient use of prior addressing circuitry with a minimum addition of new hardware circuitry in order to allow addressing of locations within and outside the local virtual address space.

In accordance with this invention, the central processor fetches an instruction word from a memory that is partitioned into plural sections and uses the contents of indexing, indirect, and memory address fields to form either a local virtual address or a global virtual address. A local virtual address identifies a location in the same section of memory that supplies an instruction; a global virtual address identifies any location in the virtual memory. There are two ways to provide a global, or extended, virtual address. First, the contents of the index register is selectively combined with the contents of the memory field to produce either a local or global virtual address.

Secondly, the address field is tested to determine if indirect addressing is required. If the address type field indicates indirect addressing, an indirect word is retrieved from the location specified by a modified address determined by the contents of the memory address field that may also have been indexed. This indirect word contains an extended addressing control field, an address type field, an index register address field and a memory address field. When the control field indicates extended addressing, the indirect word is interpreted as having more bit positions than the corresponding field in the instruction or in an indirect word that is used for local addressing. If the index register address field in an extended address indirect word indicates that indexing is to occur, an expanded contents of the specified index register is added to the contents of the extended memory address field to produce a modified extended address. Otherwise the modified extended address corresponds to the contents of the extended memory address field. The address type field controls whether this modified extended address is an effective address for an operand or an address for another indirect word. Thus, it is possible to address locations both within and outside the local virtual address space from which an instruction is obtained.

The invention is pointed out with particularity in the appended claims. The above and further objects and advantages of this invention may be better understood by referring to the following detailed description taken in conjunction with the accompanying drawings.

DESCRIPTION OF AN ILLUSTRATIVE EMBODIMENT

Figure 1:
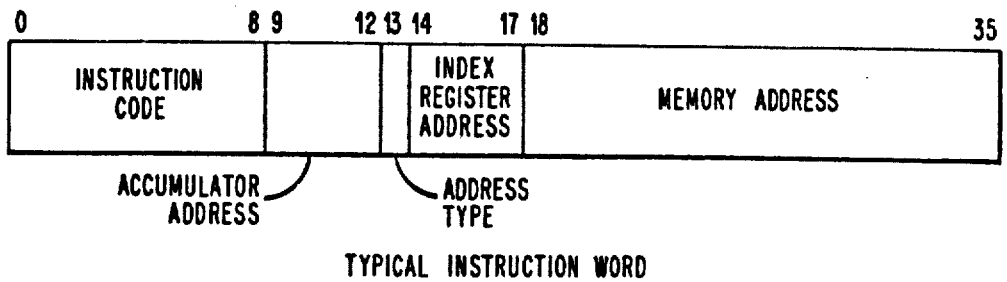
FIG. 1 depicts the organization of a typical instruction word that can be used in a central processor constructed in accordance with this invention.

FIG. 1 shows the instruction format for a typical instruction word used in the instant invention. Instructions with this format are utilized in the prior DECsystem-10 described in the PDP10 Reference Handbook. In FIG. 1, the nine high-order bits (bits 0–8) usually specify the operation of the instruction word. Bits 9–12 usually address an accumulator but are sometimes used for special control purposes, such as addressing flags. The rest of the instruction word comprises addressing fields that supply information for calculating an effective address, which is the actual address used to fetch the operand or alter program flow. Of these remaining bits, bit 13 specifies the type of addressing, bits 14–17 specify an index register for use in address modification, and the remaining 18 bits (18–35) constitute a "Y" field that can address a memory location.

Bits 13 to 35 have the same format in every instruction whether it addresses a memory location or not. The effective address of the instruction depends upon the values of the address type (I), the index register address (X) and the memory address (Y) field. The calculation of an effective address is the first step in the execution of every instruction. No other action taken by any instruction, no matter what it is, can precede that calculation. However, the calculation of the effective address (E), which refers to the actual quantity derived from the address-type, index register address and "Y" fields and used in the execution of the instruction, may constitute a memory address, an immediate operand, a mask, an offset, a shift number, or a scale factor that can be used in the operation of the central processor.

Figure 2:
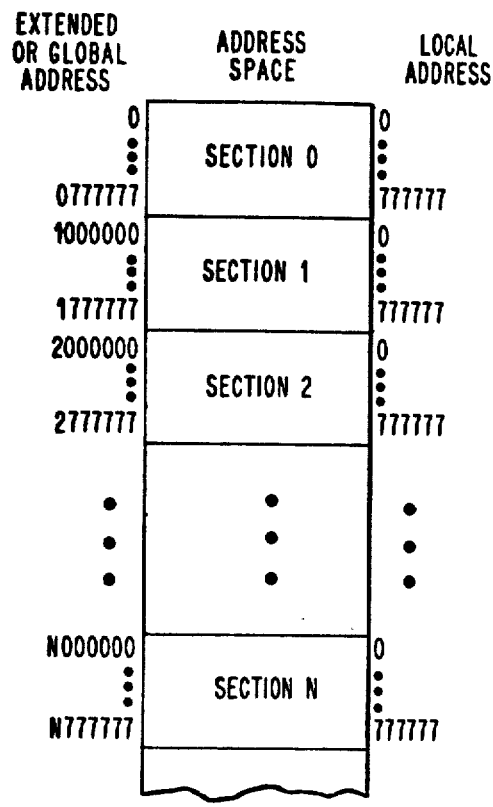
FIG. 2 is a block diagram showing the address space of a memory in a data processing system.

Since the architecture of the preferred embodiment does not use a base register, with the above instruction format, it can be seen that the address space is defined by an 18 bit address (i.e., the "Y" field). As shown in FIG. 2, a local address will address an address space having size equal to $2^{18}$ words. In FIG. 2, there are shown section numbers with each section being defined as an address space of $2^{18}$ locations. In the previous system, local addresses could identify words in only one section, i.e., the section that is designated "SECTION 0". Various memory management techniques were used to provide individual local sections to separate users so that a physical memory greater than $2^{18}$ locations could be used. However, these previous memory management techniques did not increase the virtual space available to each user beyond $2^{18}$ words.

FIG. 2 also depicts an extended, or global, address column. As is apparent from viewing FIG. 2, there is a distinct range of addresses for each of the sections. Thus, an increase in the size of the virtual address of the processor is created when the central processor can provide an extended address of more than 18 bits.

In the prior DECsystem-10, to which the instant invention relates, the 36-bit word retrieved from an index register could be divided into two half words. Each half word is capable of identifying diverse functions that the central processor can perform. For example, the high-order 18 bits of a word (bits 0–17) could contain the value of a negative iteration count. While the need to provide a new central processor that would allow an increase in the size of addressable virtual memory is apparent, the need to retain the prior developments and uses of the memory word is also required to make any such new central processor compatible with the prior central processor in order to preserve the investment the manufacturer and customers have made in programming. Thus, flexibility must be designed into the effective address calculation so that prior developments which use a memory address space for local addressing are entirely consistent with a machine which uses extended addresses.

Figure 3:
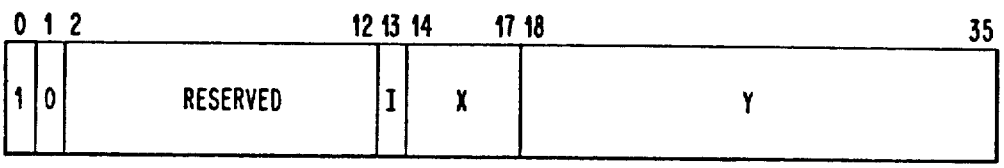
FIG. 3 depicts the organization of an instruction format indirect word that can be used in a central processor constructed in accordance with this invention.
Figure 4:
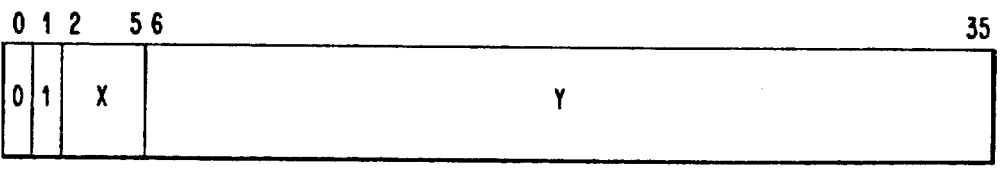
FIG. 4 depicts the organization of an extended format indirect word that can be used in a central processor constructed in accordance with this invention.
Figure 5:
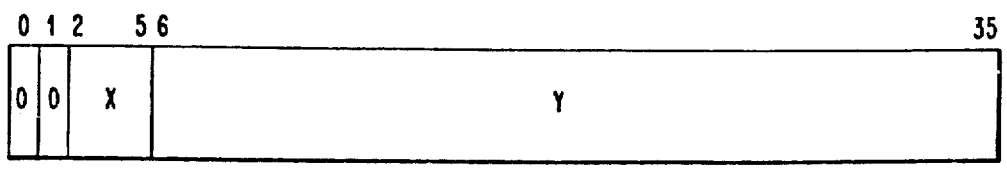
FIG. 5 depicts the organization of an extended format direct word that can be used in a central processor constructed in accordance with this invention.
Figure 6:
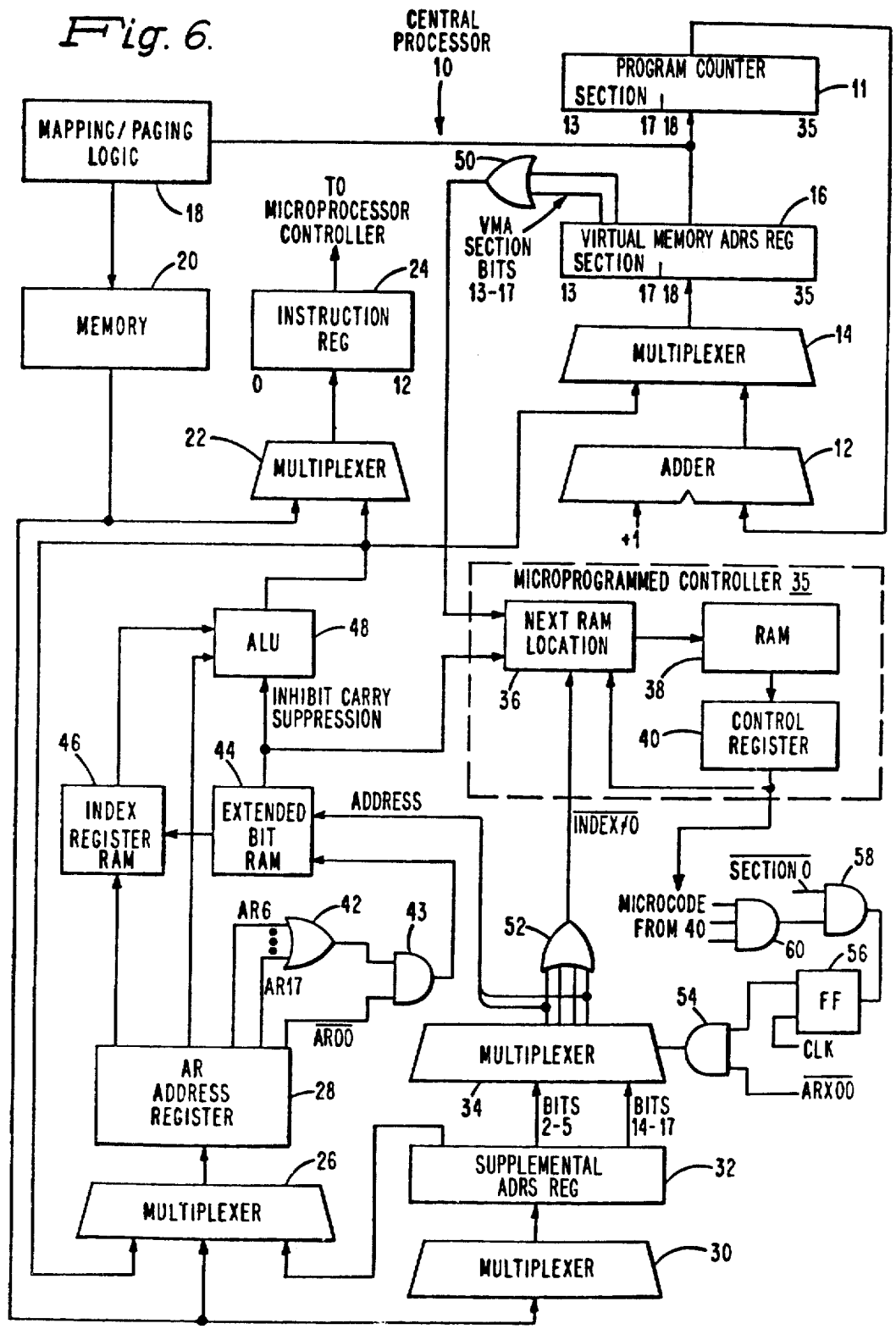
FIG. 6 is a block diagram of a central processor that is adapted for performing extended addressing in accordance with this invention.

In accordance with the above design constraints, a novel central processor was developed that generates an effective address in response to an indirect word of the type used in the prior systems that is shown in FIG. 3, in response to extended words of the type shown in FIGS. 4 and 5 or in response to a global indexing operation. More particularly, FIG. 6 shows the essential elements of a central processor 10 which are utilized in this invention. Central processor 10 has a program counter (PC) register 11 which stores the address of an instruction word such as the instruction word shown in FIG. 1. PC register 11 is connected to virtual memory address (VMA) register 16 via an adder 12 and multiplexer 14. Adder 12 normally increments the address of the instruction word from PC register 11 when a new instruction is to be executed. Multiplexer 14 merely selects an output from several inputs and provides them to register 16.

VMA register 16 is connected to mapping/paging logic 18 which translates the virtual memory addresses stored in register 16 into a physical memory address which then addresses memory 20. The instruction word from memory 20 is partially provided through multiplexer 22 into an instruction register 24. The instruction register is coupled to a microprogrammed controller 35. The instruction word in memory 20 is also provided through a multiplexer 26 into an address register 28. A second address register, called a supplemental address register (ARX register) 32, is coupled to memory 20 via multiplexer 30. The ARX register 32 is also connected to a multiplexer 34 which is responsive to microprogrammed controller 35 to select the index address for an index register 46.

More specifically, microprogrammed controller 35 has next RAM (randome access memory) location logic 36, RAM 38 and control register 40 which enable the controlling of the data paths within the central processor unit. Depending upon the output of control register 40, multiplexer 34 may select the signals in bit locations 14 to 17 of the ARX register 32 if an instruction (FIG. 1) or instruction format indirect word (FIG. 3) is being processed, and signals from bit locations 2 to 5 of the ARX register 32 if an extended format word (FIGS. 4 and 5) is being processed. With the address selected by multiplexer 34, both a bit in extended bit RAM 44 and a word in index register RAM 46 are selected.

Extended bit RAM 44 is written by OR gate 42 and AND gate 43. OR gate 42 is responsive to a word in the AR register 28 and, more specifically, to the contents of bit locations 6 to 17. If the value in bits 6 to 17 is not equal to 0 and if the signal in bit location 0 is a binary 0, AND gate 43 is enabled thereby writing into extended bit RAM 44 a binary 1. Extended bit RAM 44 is coupled to both an arithmetic and logic unit 48 and next RAM location logic 36. The output from extended bit RAM 44 into ALU 48 inhibits the carry suppression within arithmetic and logic unit 48 thereby enabling a carry to be propagated from bit location 18 to bit location 17 in an address calculation. The data to be written into extended bit RAM 44 in the preferred embodiment is calculated simultaneously with the writing of a word in the index register but before execution of an instruction word as described supra.

FIG. 6 also shows logic which enables the central processor to change from local addressing to extended addressing. More particularly, an OR gate 50 is coupled to bits 13 to 17 of VMA register 16. As apparent from viewing FIGS. 1 and 2, bits 18 through 35 define a corresponding location in each section; in this specific embodiment, bits 13 through 35 are required to identify a unique location in the virtual memory comprising all the sections. Bits 13 through 17, therefore, are called section bits. If an instruction is retrieved from SECTION 0, bits 13 through 17 have a value of ZERO. The output of OR gate 50 is provided to next RAM location logic 36 and is one input into an AND gate 58. AND gate 58 is enabled when the output of OR gate 50 is asserted (there is a binary 1 within the section bits indicating instructions are being retrieved from a section other than SECTION 0). In this case, OR gate 50 enables an AND gate 58.

The AND gate 60 is enabled by signals from the control register. AND gate 60 is merely a decoder which is enabled in response to certain bit combinations from control register 40. AND gate 58 is coupled to a flip-flop 56. When AND gate 58 is asserted, flip-flop 56 is enabled thereby indicating that the state of the central processor will provide for extended address calculations. Flip-flop 56 has its output coupled to an AND gate 54. AND gate 54 is also coupled to the most significant bit of ARX register 32, (i.e., the extended address control field in an indirect word). When the most significant bit is equal to 0, AND gate 54 is enabled thereby switching multiplexer 34 from selecting bits 14 to 17 of the word stored in ARX register 32 to bits 2 to 5 of the word stored in ARX register 32. The bits selected address the index register 46. Finally, multiplexer 34 also has an OR gate 52 coupled to the index address and providing an input into next RAM location logic 36.

Figure 7:
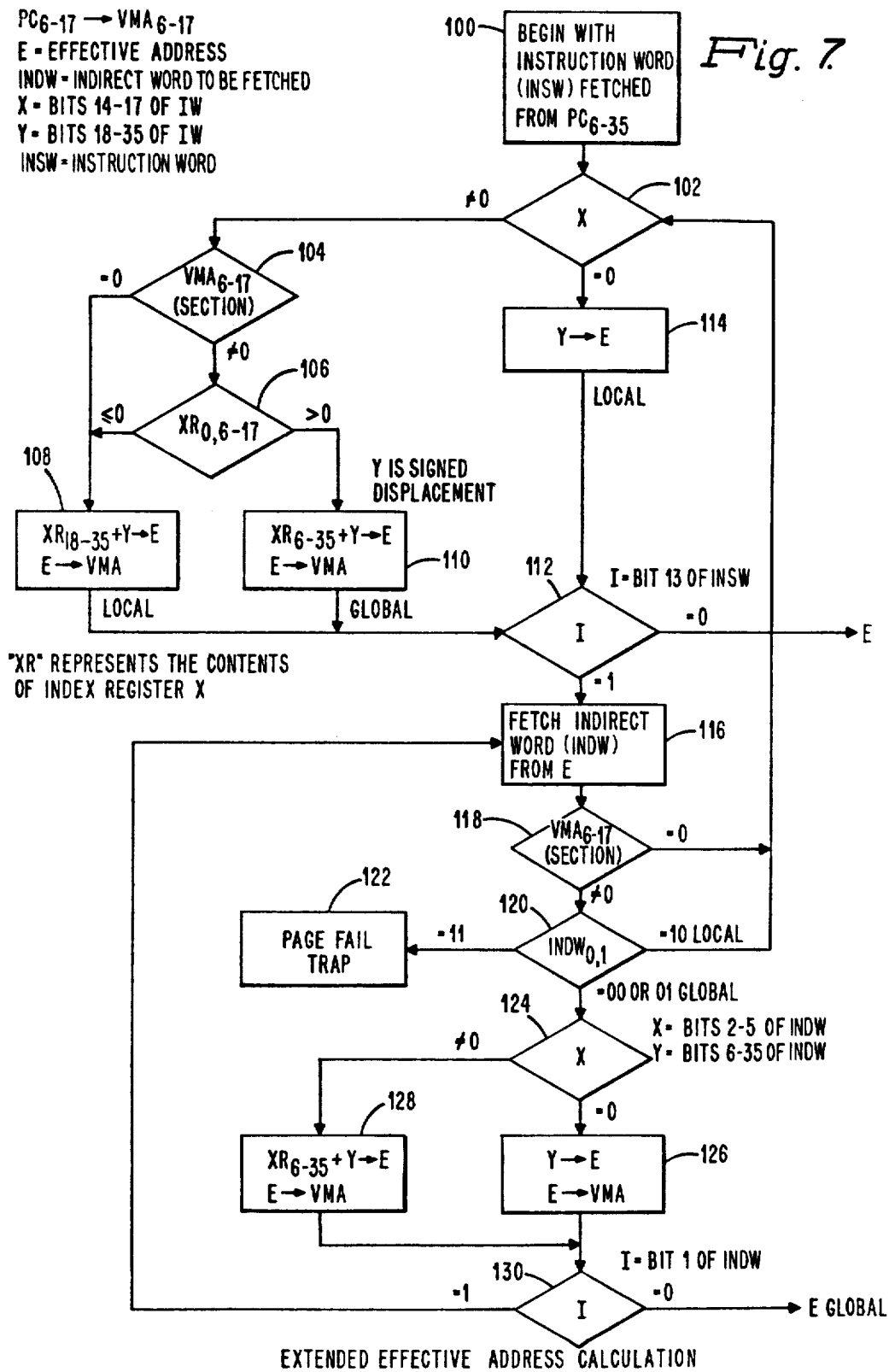
FIG. 7 is a flow diagram that depicts the operations of the central processor in FIG. 6 in response to a local or extended address.

In order to understand the operation of the circuitry in FIG. 6, reference is made to FIG. 7 which depicts those actions taken by the circuitry in FIG. 6. FIG. 7 is provided to depict graphically the complicated actions of the central processor in FIG. 6 in developing effective addresses including both a local address and an extended address. More particularly, in the central processor 10 the PC register 11 stores the address of the next instruction word to be executed by the central processor. The address in PC register 11 is transferred through an adder 12 to a multiplexer 14 and then into VMA register 16. While the length of the address contemplated by the invention is 30 bits, the actual best mode implementation described herein is 23 bits. For example, the PC register 11 can hold up to 30 bits in the preferred embodiment, however, the word actually stored in the PC register 11 is 23 bits (i.e., bits 13 through 35). Adder 12 normally increments by 1 the value of the word from the PC register 11 when a next instruction is to be executed.

This address is transferred to mapping/paging logic 18 which converts the virtual address into a physical memory address. Initially, this is a 22-bit physical address which then addresses memory 20. When the physical address in memory 20 is located, the word from memory is transferred through a multiplexer 22 into an instruction register 24. Instruction register 24 stores part of the memory word, such as the instruction code in bits 0 through 8 and the accumulator address in bits 9 through 12, and is connected to the microprogrammed controller 35. However, for purposes of this invention, the relationship of the instruction register to the microprogrammed controller is not necessary. A further description of the instruction register and its relation to the central processor is available in the "DECsystem-10/DECSYSTEM-20 Hardware Reference Manual" described supra.

Finally, the memory word from memory 20 is also transferred into ARX register 32 via multiplexer 30.

As shown in FIG. 7, once the above-working registers of the central processor hold the appropriate information, box 102 requires a test of the memory word which is located in ARX register 32; initially this is the instruction. Box 102 determines whether the fetched memory word requires an indexing operation. Stated differently, do bits 14 to 17 of the instruction word have all binary values equal to 0? If so, there is no indexing; if not, there is indexing.

In carrying out the test for box 102, the contents of the ARX register 32 are detected by microprogrammed controller 35. Microprogrammed controller 35, in combination with arithmetic and logic unit 48, produces most of the control functions for the central processor 10. Neither of these logic elements forms the gravamen of the invention; however, additional descriptions of these logic units can be found in the previously identified "DECsystem-10/DECSYSTEM-20 Hardware Reference Manual."

Figure 8:
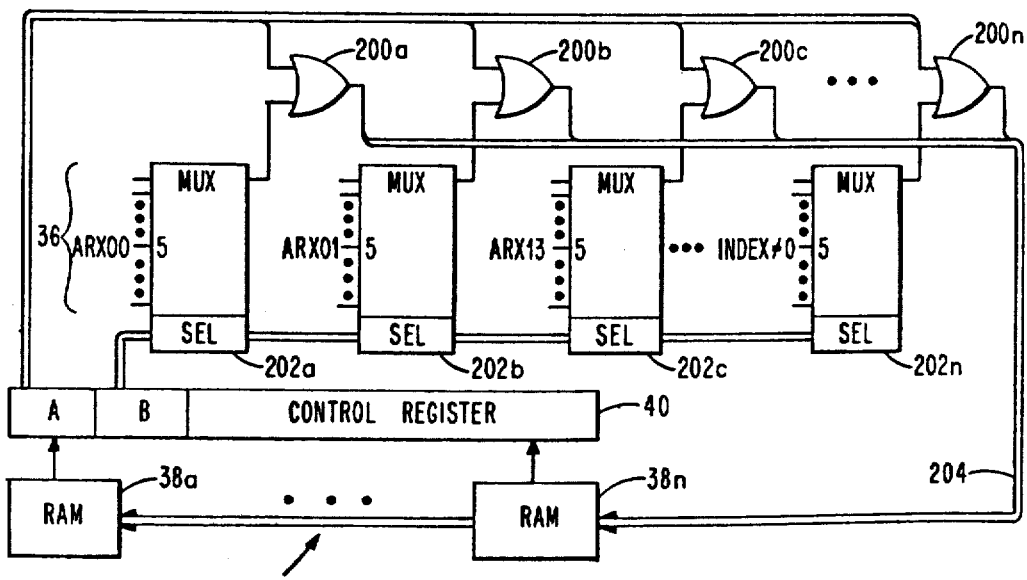
FIG. 8 is a schematic diagram of a microprogrammed controller shown in FIG. 6.

In order to understand how the central processor 10 functions when a box, such as a decision box 102, is to be performed, reference is made to FIG. 8. In recent years, control units comprising microprogram responsive controllers and microprogram memories have replaced combinatorial logic because such microprogrammed controllers are easier to construct, are more flexible, and are less expensive to implement. In FIG. 8, the microprogrammed controller includes control lines 36 which receive inputs from various circuits located within the central processor in order to determine which specific sequence of data transfers within the central processor will occur. The combination of signals over these inputs identifies a location in RAM 38 which then reads out the specific microcontrol word into a control register 40 to establish the sequence of events in accordance with FIG. 7. Although FIG. 7 shows a specific sequence of data transfers within the central processor 10, it will become apparent that different sequences can also be used to implement the invention.

In operation, it is assumed that microinstruction words have been loaded into RAM 38. One location is selected out of RAM 38 and loaded into control register 40. Control register 40 has several fields with an A and B field being shown. The left-most field, the A field, indicates the next microinstruction address to be executed; the B field modifies that next instruction address. The A field is provided to OR gates 200. In the representative example, OR gates 200A through 200N are shown. In actuality, the A field is 11 bits long and OR gate 200A receives the first bit of the A field, OR gate 200B receives the second bit of the A field, etc.. The B field of control register 40 provides an input to multiplexers 202. This input value enables selection of one of the many inputs coupled to it. This selected signal is then provided by multiplexer 202 to OR gates 200. As an example, if the B field had a binary value equal to 5 at its select input, then multiplexer 202 would have the data at its 5th input transferred through to OR gates 200. Inputs to multiplexer 202 may be any of the signals shown in the instant invention. For example, looking at the 5th input only, the input to multiplexer 202A is shown to be ARX00 (that is, the most significant bit in the ARX register). The input to multiplexer 202B is ARX01 (the next most significant bit in the ARX register 32). In like manner, the input to multiplexer 202C is ARX13 and to 202 is "index=0". Thus, these inputs are transferred to OR gates 202A through 202N and are transferred over bus 204 to address RAM 38. The word stored in the RAM location addressed by the word over bus 204 is then provided into control register 40. This word controls the various data paths to be taken in the central processor 10.

If a central processor wants to test a specific function, the microcode of the microprogrammed controller 35 selects out the appropriate signals via multiplexers 202 and determines the appropriate values. In the example shown, there are a number of possible control functions which could be selected. Moreover, depending upon the results of the values selected, it is possible that the microcode may branch to one of several different locations within RAM memory 38 depending upon the different inputs provided into multiplexers 202. As a result, depending upon the different values established at the inputs of the multiplexer 202, different functions of the central processor 10 are performed. Thus, multiplexers 202 can test the state of a flag, a signal, or contents of a register and correspondingly control the data paths necessary to be established by the central processor itself.

Returning to FIG. 7, the memory word loaded in ARX register 32 is tested in box 102 by the microprogrammed controller 35 to determine whether the bits 14 to 17 in ARX register 32 are binary 0's. In performing this test, the contents of bits 14 to 17 of the ARX register 32 are transferred through multiplexer 34. Multiplexer 34 is controlled by AND gate 54 which, in its initial condition, permits multiplexer 34 to transfer bits 14 to 17 of the ARX register 32 through OR gate 52 into next RAM location logic 36. If the OR gate 52 had all binary 0 inputs from bits 14 to 17, then one RAM 38 address, which indicates that no indexing is required, is enabled. If, however, OR gate 52 had one of its inputs asserted, the next RAM location logic 36 is modified and a different sequence of events results. Thus, the next address calculated by logic 36 would enable a different address from RAM 38 which would then provide the next microcode data path into control register 40 indicating that an index operation would be performed.

Assuming that bits 14 to 17 in the ARX register 32 are binary 0's, bits 18 to 35 of ARX register 32 (i.e., the "Y" field) are transferred through multiplexer 26 into AR register 28 in a non-indexed form, where they may be used as data for instruction register 24. In addition, if bit 18 of the ARX register is a binary 0, bits 19 through 35 are considered as a positive address number, and bits 0 through 17 of AR register 28 are written as binary 0's; however, if bit 18 of ARX register 32 is a binary 1, bits 19 through 35 are considered as a negative address number, and all binary 1's are written in AR register 28 bit locations 0 through 17. This latter operation is an example of a known operation of sign extension.

Upon determining that the index bits (bits 14 through 17 of the instruction) were all binary 0's, block 114 of FIG. 3 indicates that a local modified address is developed. For block 114, the memory word in AR register 28, with the sign extension as indicated supra, is transferred through arithmetic and logic unit 48 to VMA register 16 via multiplexer 14. VMA register 16 stores the actual effective address in bit locations 18 to 35. Bits 13 through 17 remain unchanged from their previous value which came from PC register 11. This memory address would be local since no extended operation has been indicated. Concurrently with the loading of VMA register 16 with the 18 bits of the memory address, the output of the ALU unit 48 is transferred back through multiplexer 26 and stored in AR register 28. While this operation does not modify the contents of register 28 where there is no indexing, where indexing does occur, this operation will be necessary as explained below.

In block 112 of FIG. 7, the central processor determines whether the microprogrammed controller 35 detects a binary 1 or a binary 0 in bit 13, the address type field, of the memory word stored in ARX register 32. If bit 13 is a binary 1, an indirect memory word is required and therefore another memory fetch must occur. If bit 13 of ARX register 32 is a binary 0, the address stored in VMA register 16 is the effective address. As a result, the effective address for a location in the local virtual address space has been calculated by central processor 10.

In step 102, if the output of OR gate 52, when tested by the microprogrammed controller 35, indicates that indexing is required, control passes from box 102 in FIG. 7 to box 104. For the particular test in box 102, multiplexer 34 transfers bits 14 to 17 (the index register address field) of ARX register 32 through OR gate 52 into next RAM location logic 36. Multiplexer 26 transfers the word with the previously described sign extension into AR register 28. Since indexing is indicated, OR gate 52 provides a binary 1 into next RAM location logic 36; and a different microcontrol word from control register 40 is enabled. This control word allows the testing of bits 6 through 17 in the virtual memory address register 16 as shown in FIG. 6 and in box 104 of FIG. 7. Thus, box 104 tests to determine whether the instruction was retrieved from SECTION 0.

As described previously, the best mode implementation as used herein only requires bits 13 through 17 to be used in the VMA register 16, but it is envisioned that bits 6 to 17 could be fully utilized by the VMA register in defining a section address. OR gate 50 is coupled to the output of the section number part of VMA register 16, i.e., bits 13 through 17, and provides one input into AND gate 58 and a second input into next RAM location logic 36 of microprogrammed controller 35. If the section number in VMA register 16 is a binary 0, AND gate 58 is not asserted and the next RAM location logic 36 enables a microinstruction to add the contents of address register 28 to the contents of bits 18 through 35 of a selected register in index register array 46 which is addressed by bits 14 through 17 from ARX register 32 via multiplexer 34. This is a conventional indexing operation.

Index register array or RAM 46 contains 16 registers which have been previously loaded during the operation of the central processor 10. For this loading operation, a selected index register is written from AR register 28 and, depending upon the word stored in AR register 28, a 16-word 1-bit array 44 has a binary 0 or binary 1 written into a location corresponding to the selected register. The binary value written in RAM 44 is dependent upon the assertion of OR gate 42 and AND gate 43. OR gate 42 is responsive to the binary values located in bit locations 6 to 17 of AR register 28. If any one of these bit locations has a binary value equal to 1, OR gate 42 is asserted. AND gate 43 is also responsive to the binary value of the most significant bit in AR register 28. If bit location 0 has a binary value of 0, and OR gate 42 is asserted, AND gate 43 will be asserted thereby enabling a binary 1 to be written into the selected location in bit RAM 44. A binary 1 in RAM 44 indicates that an extended address has been provided. If OR gate 42 has all binary 0 inputs or if the binary value of the most significant bit in the AR register 28 is a binary 1, AND gate 43 will not be asserted and a local address will be specified. This is known as local indexing.

Returning to FIG. 7, if the section number in the VMA register 16 in FIG. 6 identifies a section other than SECTION 0, control passes from box 104 to box 106. In accordance with box 106, the extended bit RAM 44 is tested. If the bit has a value of ONE, corresponding to an index value that is a positive number (bit 0 is a binary 0) and the index has a non-zero section number, box 106 diverts operations to box 110 whereupon global indexing occurs. Specifically, bits 6 through 35 of the index register, rather than bits 18 through 35, are added to the contents of the memory address field as sign extended (bits 10 through 35). Regardless of the results of the test in box 106, the sign extended memory address field stored in AR register 28 is added to the index value stored in index register 46 addressed by multiplexer 34. The output of ALU register 48 is then provided to VMA register 16.

If the value of the extended bit addressed in bit RAM 44 is a binary 1, this output controls ALU 48 so as to inhibit the carry suppression that normally occurs in the calculation of an effective address. As a result, bits 13 through 35 of the calculated address are provided into VMA register 16. If, however, the extended bit RAM 44 has a binary 0 output, the ALU unit 48 has its carry suppressed and only bits 18 through 35 of VMA register 16 are modified while bits 13 through 17 remain unchanged from the value previously loaded from bits 13 through 17 of the PC register 17 or as a result of previous addressing calculations.

As previously indicated, the indirect bit stored in ARX register 32 is tested by the microprogrammed controller 35 in box 112. If bit 13 of ARX register 32 is a binary 0, then the local or global address as stored in VMA register 16 contains the effective address. If the binary value of bit location 13 of ARX register 32 is a binary 1, then the modified address specifies the location of an indirect word that must be retrieved so the central processor 10 may calculate the effective address.

The central processor 10 uses the calculated, or modified, address stored in VMA register 16 to obtain the indirect word. However, if an extended address had been calculated, the output of OR gate 50 would have modified the next microinstruction from microprogrammed controller 35 and would also have provided one enabling input to AND gate 58. The second input to AND gate 58 is a microcontrol instruction provided to decoder 60 which is the result of the next RAM instruction being executed. Thus, decoder 60 is enabled, and as a result, AND gate 58 is enabled, thereby setting flip-flop 56 which provides an asserted input to AND gate 54. Flip-flop 56 indicates that the state of the machine is now in global address.

For block 116, the modified address stored in VMA register 16 defines the location of the indirect word. This address word in the VMA register 16 is transferred through mapping/paging logic 18 to select the memory location in memory 20 from which the indirect word is then transferred into ARX register 32 via multiplexer 30. This indirect word will be interpreted to have the form that is disclosed in FIGS. 3, 4, or 5. If the most significant bit in ARX register 32 is a binary 1, the indirect word is interpreted as in the prior art with the format that is depicted in FIG. 3. If the most significant bit in the ARX register 32 is a binary 0, the indirect word is interpreted as having the format that is depicted in FIGS. 4 and 5. Referring to FIG. 6, AND gate 54 is enabled thereby switching multiplexer 34 to select bits 2 through 5 of the ARX word as the index register address as opposed to bits 14 through 17 which was previously done.

In Block 118, the section number (bits 6 through 17) in VMA register 16, is tested by microprogrammed controller 35 via OR gate 50 to determine whether it has a value equal to binary 0. If the value is binary 0, the conditions imposed by AND gate 58 are not satisfied, and flip-flop 56 becomes disabled thereby returning the central processor to box 102 and a normal address calculation.

However, if VMA register 16 has a section number unequal to 0, then tests on the indirect word (FIG. 4 or 5) are made. In block 120, the two high order bits of the indirect word stored in ARX register 32 are tested. If the first two bits in the ARX register 32 have binary 1 values, then a page trap fail (block 122) occurs. This indicates that a reserve feature not yet implemented has occurred. Conversely, if the bits have a binary value of 1,0, a local address exists because the indirect word has the format of FIG. 3; and, as a result, the microprogrammed controller enables the operations described previously in order to calculate a local address. These operations are shown in FIG. 7 beginning with box 102.

If, however, the most significant bit in the ARX register 32 has a binary 0 value, then an extended address calculation must be made. The address stored in ARX register 32 is transferred through multiplexer 26 to address register 28. Then central processor 10 tests whether bits 2 through 5 of the words stored in ARX register 32 are a binary 0, because these bits constitute the index register addressing field in an extended format word. If microprogrammed controller 35 detects that all of bits 2 through 5 are binary 0's in box 124, no indexing is required. The address stored in address register 28 is then transferred through ALU unit 48 into VMA register 16 via multiplexer 14 and concurrently stored back in AR register 28 via multiplexer 26 in box 126. Thus, VMA register 16 stores bits 13 through 35 which would be a modified extended address for the instruction that has not been indexed.

If the tests by central processor 10 on bits 2 through 5 of ARX register 32 in box 124 establish a value unequal to 0, a different microcode instruction is executed by microprogrammed controller 35 and the value stored in index register 46 addressed by bits 2 to 5 of ARX register 32 is added to the address in AR register 28 in box 128. This microcode word permits a carry to be made and as a result bits 13–35 coming from ALU 48 are written into VMA register 16. The value from arithmetic and logic unit 48 is also transferred back to AR register 28 via multiplexer 26 as a modified extended address that has been indexed.

Once having calculated a modified extended address from the indirect word, the central processor 10 determines whether this indirect word calls for a further indirect word. As shown by block 130, bit 1 (i.e., the address type field of the word located in ARX register 32) is tested by microprogrammed controller 35. If bit 1 has a binary value equal to 0, the modified extended address is the effective address that can address any of the virtual locations. Thus, it is an extended or global effective address. This value is stored in VMA register 16 in bit locations 13 through 35. If, however, the value of the indirect bit stored in ARX register 32 is a binary 1, then another memory fetch from the location identified by the modified address that is stored in VMA register 16 occurs.

As previously indicated, one object of this invention is to achieve compatibility with prior systems limited to local addressing. Boxes 104 and 118 in FIG. 7 assure this compatibility. When an instruction of the prior system is executed, it will be in SECTION 0, so box 104 always transfers operations to the indexing in step 108. Thus the formation of an extended address by indexing is inhibited. This limits indexing to the prior indexing operations so that step 108 can only produce a local address for storage on the VMA register. If indirect addressing is required, box 118 diverts operations back to box 102 so extended addressing by indirect words is also inhibited.

It will now be apparent that the logic shown in FIG. 6 contains many equivalents. For example, the logic 42 and 43 which calculates the extended bit written into bit RAM 44 is done solely for timing purposes. It is entirely possible that while logic elements 42 and 43 could be driven off of index register 46 directly, the preferred implementation only provides for certain timing sequences which are used by the central processor 10.

In addition, with respect to the logic shown in FIG. 6 where single lines are shown, there may be multiple lines in actual practice. Moreover, not all the paths from control register 40 to gate the remaining logic shown in FIG. 6 have been shown nor have all the paths into the next RAM location logic 36 been shown. However, since microprogrammed control logic is well established, it is not essential for an understanding of the invention.

The registers indicated in the above FIG. 6 are standard registers. For example, the arithmetic and logic unit with the carry suppression bit can be a standard Motorola or Texas Instruments integrated circuit numbers 10181 or 10179. The masking operations indicated in the description are also well known.

If the address at the end of the calculation provided above is an extended address (as may be provided as outputs from blocks 112 or 130), the effective address may be used by the instruction to fetch or store a memory operand. Thus, the instruction word originally begun with may obtain a memory operand from any one of the sections as identified in FIG. 2. Under previous known technology, only one section existed and the operands obtained by the instruction would always be from the same section. However, with the extended addressing provided in this invention, an extended address having section numbers as previously indicated can be addressed into virtual memory and in more than one section. As a practical example, if a program is running in section 1 as shown in FIG. 2, and an instruction is provided to pick up a memory operand and load it into an accumulator (e.g., a MOVE instruction), the extended addressing, with or without indexing, could be used to fetch the memory operand out of section 6 and load it into the accumulator. A subsequent ADD instruction may then fetch another memory operand out of a different section and add it to the same accumulator. The result is that the accumulator contains the sum of a section 6 operand and a different section operand. This demonstrates that the amount of addressable virtual memory that is available to an instruction word exceeds the amount that can be defined by the memory address field of that instruction.

The foregoing discussion has been limited to a specific implementation of a central processor capable of calculating both a local address and an extended address. However, an understanding of this specific implementation will enable a person of ordinary skill in the art to implement other logic of an equivalent nature in this specifically disclosed central processor or other central processors. Therefore, it is the object of the appended claims to cover all such variations and modifications as come within the true spirit and scope of this invention.

What is claimed as new and desired to be secured by Letters Patent of the United States is:

1. A central processing means for processing instructions, indirect words and operands stored in a memory means having a plurality of storage locations specified by virtual memory addresses wherein the memory means is partitioned into a plurality of sections, each of the instructions and indirect words having a memory address field and an address type field, the memory address field in each instruction defining a number of locations corresponding to the number of locations in one memory section and each indirect word having a format field that defines first and second sets of bit positions in the addressing and address type fields, the number of addressing field bit positions in the first and second sets uniquely defining a location in either one specific section of the memory means and in any section of the memory means, respectively, said central processing means comprising:
   A. first storage means for the memory address field and the address type field,
   B. second storage means for storing an address that uniquely defines a location in the memory means,
   C. address generating means connected to said first and second storage means for generating an effective address in response to the address type field and the memory address field in an instruction during at least one iteration, said address generating means including:
      i. means responsive to the contents of the memory address field in said first storage means for storing in said second storage means an intermediate address,
      ii. field control means connected to said first storage means for establishing, during each iteration and in response to indirect and direct states defined by the address type field, whether the contents of the second storage means constitute, respectively, the address of an indirect word or the effective address,
      iii. transfer means connected to said second storage means and said field control means for transferring, for each iteration that occurs during an indirect state, an indirect word to said first storage means from the location specified by the contents of said second storage means,
      iv. selection means connected to said first storage means for selecting, during each iteration, the memory address field and the address type field from the corresponding sets of locations in the indirect word in response to the contents of a format field of the indirect word in said first storage means, and
      v. controller means connected to said field control means and said selection means for terminating further iterations of said address generating means when the address type field in said first storage means defines the direct state thereby to indicate that said second storage means contains the effective address.

2. A central processing means as recited in claim 1 wherein said intermediate address storing means in said address generating means includes arithmetic-logic means for producing an intermediate address.

3. A central processing means as recited in claim 2 wherein each instruction includes an indexing field and said intermediate address storing means in said address generating means further includes indexing means responsive to the indexing field for producing an indexing value, said arithmetic-logic means being connected to said indexing means for producing an intermediate address in response to the memory address field and the indexing value.

4. A central processing means as recited in claim 2 wherein said selection means includes means having inputs connected to the respective bit positions of the memory address field and the addressing type field in the first and second sets of bit positions for selectively passing information from one of the first and second sets to said arithmetic-logic means.

5. A central processing means as recited in claim 4 wherein each instruction includes an indexing field that is included in the first and second sets of bit positions and said intermediate address storing means in said address generating means further includes indexing means responsive to the indexing field for producing an indexing value and multiplexing means connected to said first storage means for routing the indexing field from the first and second sets of bit positions to said indexing means.

6. A central processing means for processing instructions and operands stored in a memory means having a plurality of storage locations specified by virtual memory addresses wherein the memory means is partitioned into a plurality of sections, each of the instructions having a memory address field and an indexing field, the memory address field in each instruction defining a number of locations corresponding to one memory section, said central processing means comprising:
   A. first storage means for storing the memory address field and the index field,
   B. second storage means for storing an address that uniquely defines a location in any section of the memory means,
   C. address generating means connected to said first and second storage means for generating an effective address in response to the memory address and indexing fields, said address generating means including:
      i. a plurality of index register means, each said index register means having a number of bit positions in excess of the number of bit positions in the memory address field of an instruction, ii. selection means connected to said first storage means and said plurality of index register means for selecting one of said index register means as a source for an indexing value, iii. arithmetic means connected to said first and second storage means and said plurality of index register means for storing in said second storage means an address value determined by combining the indexing value and the memory address field, and iv. control means connected to said arithmetic means and said plurality of index register means for selectively coupling to said arithmetic means an indexing value limited to the number of bit positions in the memory address field or to an indexing value having a number of bit positions in excess of the number in the memory address field in response to the value in said selected index register means whereby said arithmetic means produces an address value that can identify a memory location in any of the memory sections.

7. A central processing means as recited in claim 6 wherein the memory means also stores indirect words that each include a memory address field, an address type field, and a format field that defines first and second sets of bit positions in the memory address field and address type field, said first storage means further storing the memory address field, address type field and format field of an indirect word, the number of address field bit positions in the first and second sets uniquely defining a location in a section of the memory means and in any section of the memory means, respectively, and wherein each instruction includes an address type field, said address generating means further generating the effective address during at least one iteration and including:

v. field control means connected to said first storage means for establishing, during each iteration and in response to indirect and direct states defined by the address type field, whether the contents of the second storage means constitute, respectively, the address of an indirect word or the effective address, vi. selection means connected to said first storage means for selecting, during each iteration, the memory address field and the address type field from the corresponding sets of locations in the indirect word in response to the contents of the format field of an indirect word stored in said first storage means, and vii. means in said control means connected to said field control means and said selection means for terminating further iterations of said address generating means when the address type field in said first storage means defines the direct state thereby to indicate that said second storage means contains the effective address.

8. A central processing means as recited in claim 7 wherein a predetermined one of the memory sections is a reference section and wherein said control means includes means connected to said second storage means for inhibiting the generation of an effective address to others of the memory sections when the contents of said second memory storage means identifies a location in the reference memory section.

* * * * *